July 6, 1937. C. L. BEST 2,085,944
VEHICLE
Filed March 6, 1934 4 Sheets-Sheet 1

INVENTOR.
Clarence L. Best
BY Charles M. Fryer
ATTORNEY.

July 6, 1937.　　　C. L. BEST　　　2,085,944
VEHICLE
Filed March 6, 1934　　　4 Sheets-Sheet 2

INVENTOR.
Clarence L. Best
BY Charles M Fryer
ATTORNEY.

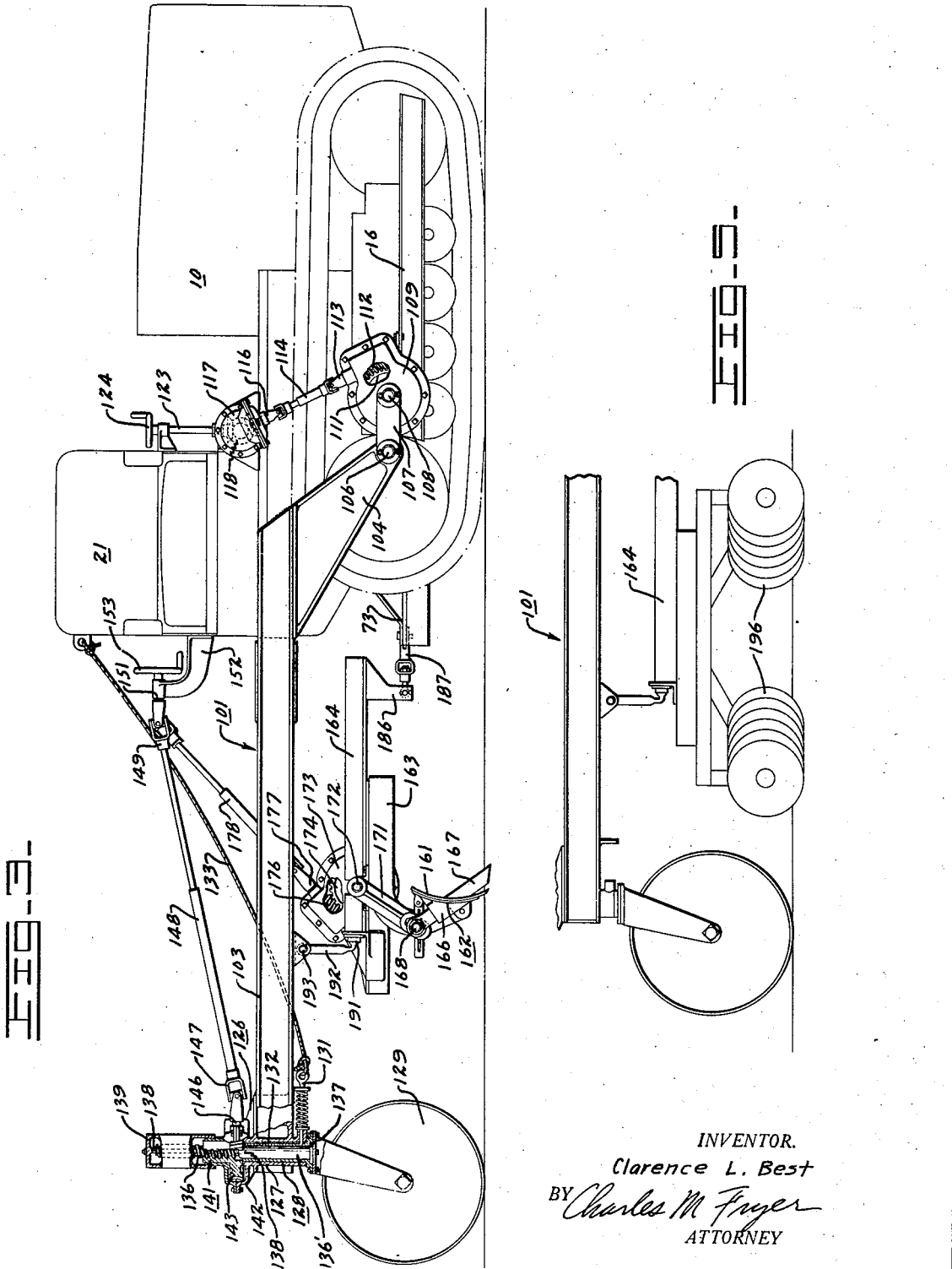

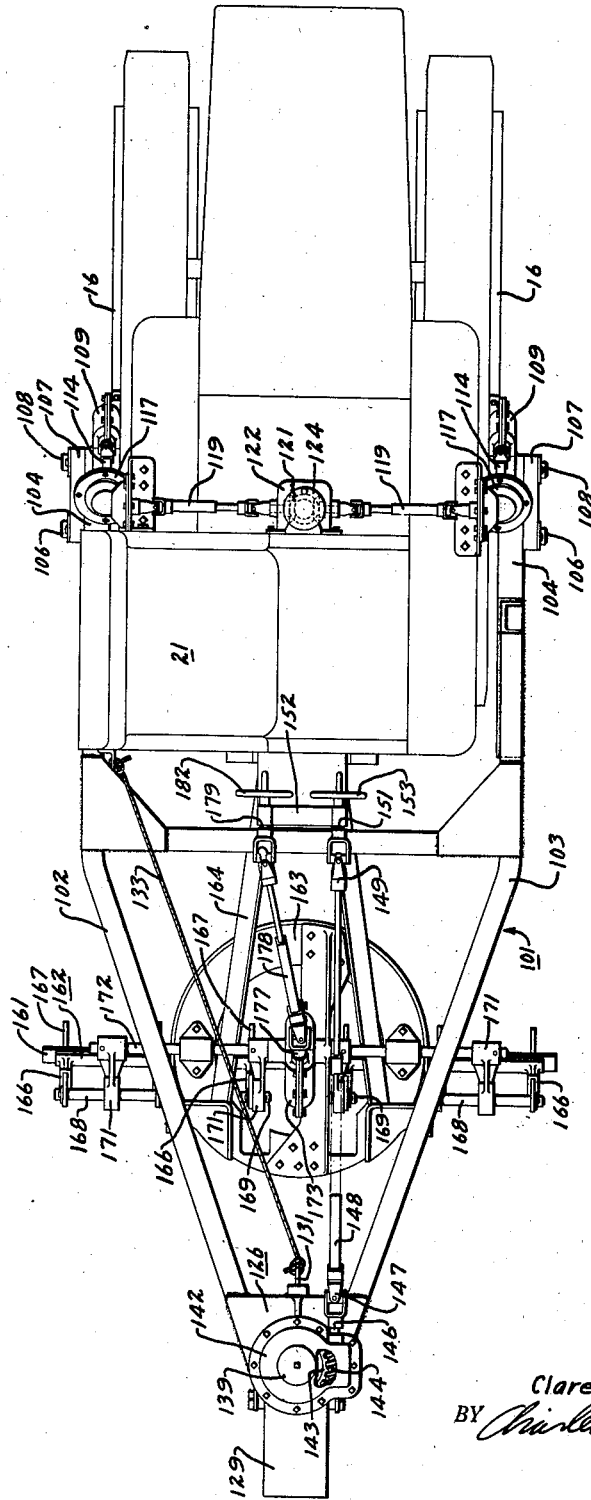

Patented July 6, 1937

2,085,944

UNITED STATES PATENT OFFICE 2,085,944

VEHICLE

Clarence L. Best, Mission San Jose, Calif., assignor to Caterpillar Tractor Co., San Leandro, Calif., a corporation of California Application March 6, 1934, Serial No. 714,353

5 Claims. (Cl. 37—178)

The present invention relates to vehicles, and more particularly to the provision of a tractor-implement combination in which the implement is connected and supported for steering as a unit with the tractor or draft vehicle.

It is an object of the invention to provide a machine of improved construction having a ground-engaging implement which is mounted rearwardly of the draft vehicle to provide a pull-type machine, and which has ground-engaging means providing for steering of the implement as a unit with the draft vehicle.

Another object of the invention is the provision of an improved type of road machine having as a draft vehicle a tractor of conventional construction, and also having a scraper blade frame connected to the rear of said tractor to provide a pull-type road machine.

Another object of the invention is to provide a road machine, of the character described, in which the implement frame is connected for steering as a unit with the tractor and has relative vertical oscillation with respect to the tractor; the implement frame having a ground support independent of the tractor.

Another object of the invention is to provide an improved tractor-implement combination, of the character described, in which the implement frame has one end supported on the tractor and the other end supported by a caster wheel.

Another object of the invention is to provide an improved implement frame construction having improved ground-engaging means adapting the implement frame for turning as a unit with the draft vehicle therefor.

Other objects will appear as the description progresses.

Description of figures

Fig. 1 is a right side elevation.

Fig. 2 is a plan view.

Figs. 3 through 5 illustrate a second form of the invention.

Fig. 3 is a right side elevation.

Fig. 4 is a plan view.

Fig. 5 is a fragmentary side elevation, similar to Fig. 3, but illustrating a different type of implement.

Description of mechanism

Figure 1:
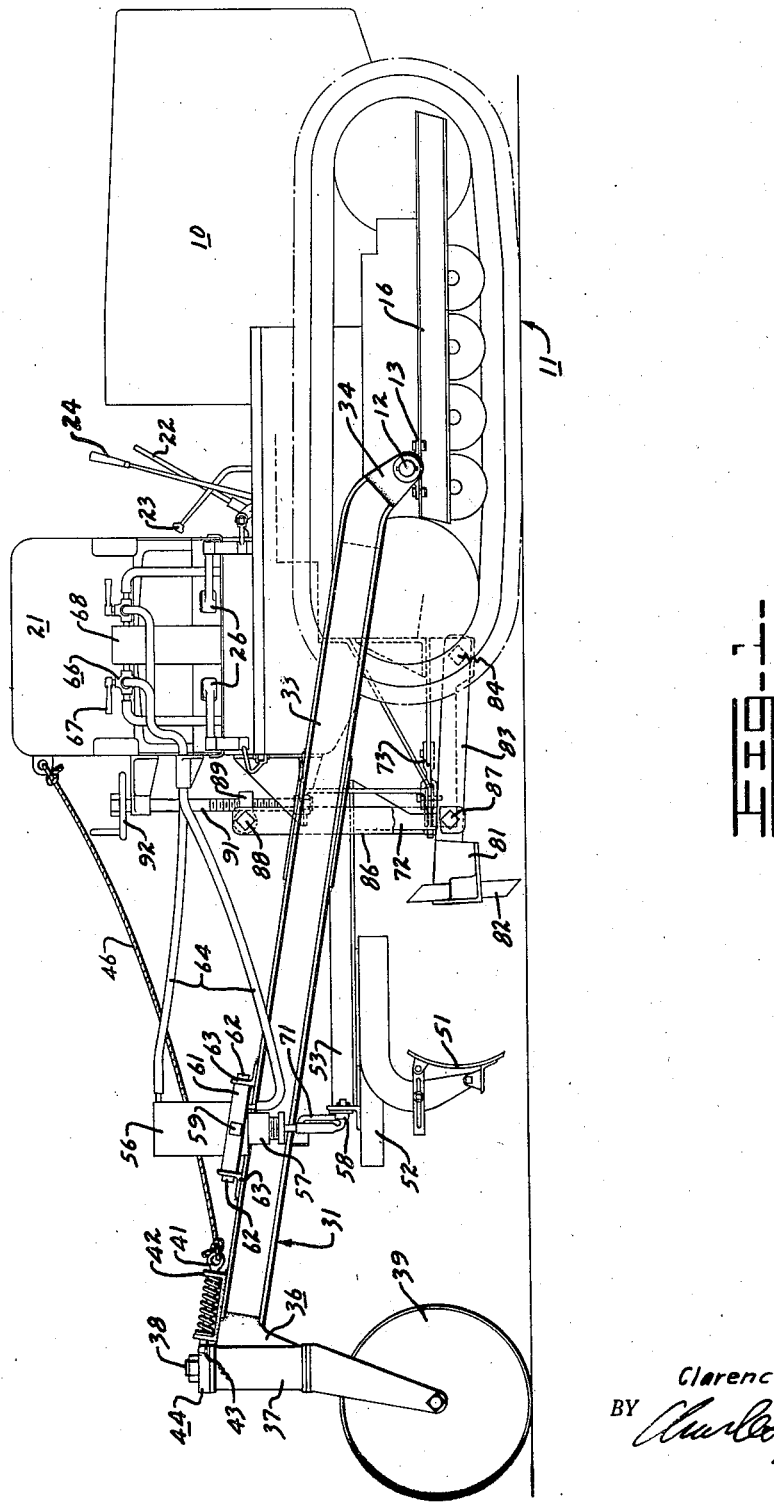
Figs. 1 and 2 illustrate one form of the invention.
Figure 2:
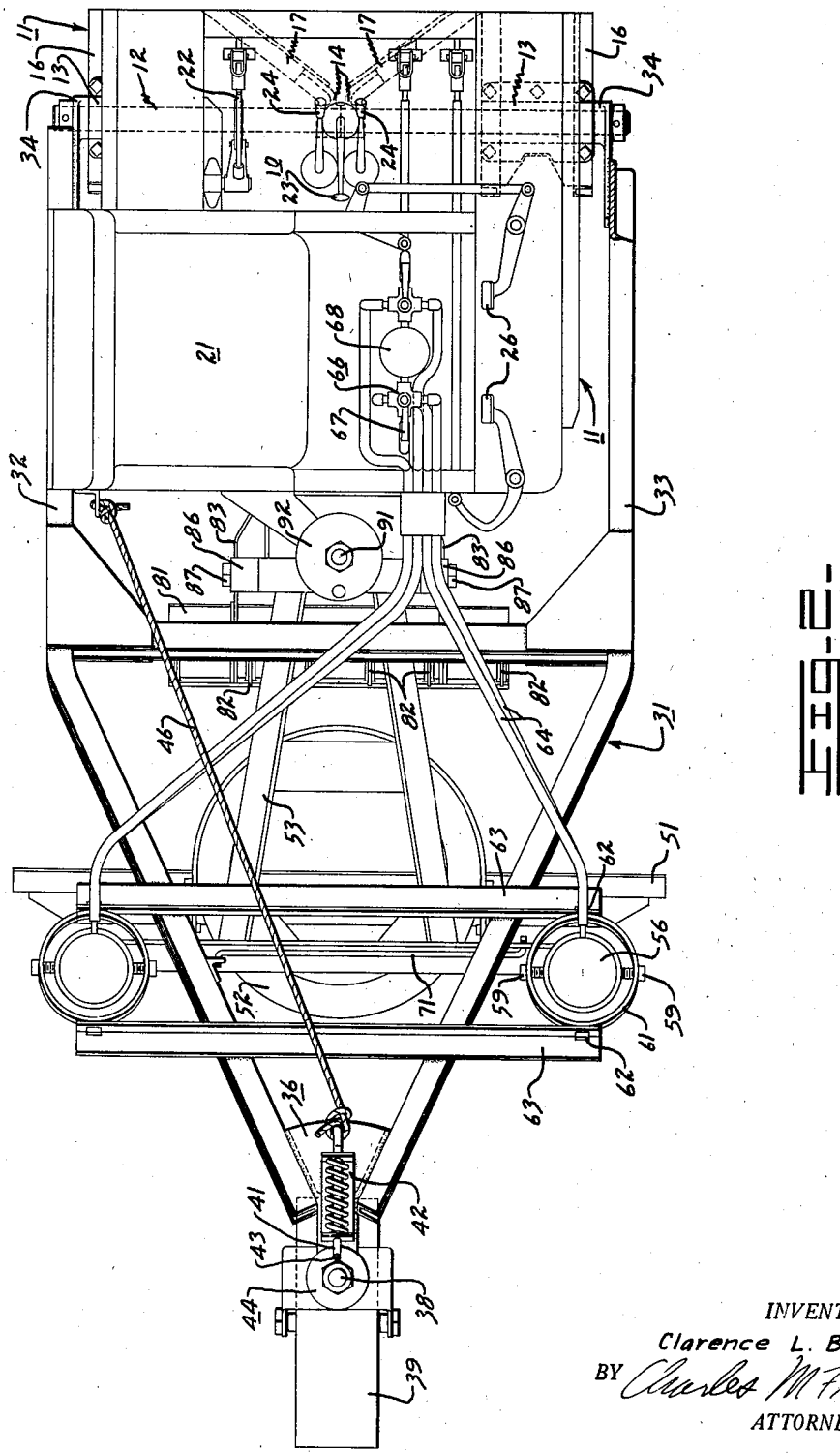

The vehicle or tractor-implement combination disclosed in Figs. 1 and 2 comprises generally a tractor of conventional construction, preferably a track-type tractor, to which a rearwardly extending implement frame is attached, the rear support for the implement frame being constructed to avoid the necessity of a steering control therefor, and to permit short turning of the tractor-implement combination. A machine of this character is of particular applicability in road working apparatus where the implement frame supports a ground working tool such as a grader blade.

The tractor comprises body 10 (Figs. 1 and 2) which is supported upon similar opposite track mechanisms 11 by means including transverse pivot shaft 12 mounted in body 10, and having spaced pivotal connections 13, 14 with each track frame 16 and with diagonal braces 17 therefor. Side seat 21 is provided on body 10; and forwardly thereof, a plurality of tractor controls are mounted, including main clutch lever 22, gear shift lever 23, and steering clutch levers 24. In front of seat 21 at the side of the tractor, brake pedals 26 are provided for operating the brakes associated with the usual track steering clutches controlled by levers 24 in the usual manner.

Implement frame 31 (Figs. 1 and 2) is provided at the rear of the tractor, and has its front end pivotally supported thereon, while its rear end is provided with a caster wheel support. Frame 31 includes opposite side members 32, 33 pivotally supported at their front ends by means of brackets 34 on the respective ends of shaft 12, and converging at their rear ends to bracket 36. Bracket 36 has vertically apertured boss 37 receiving post 38 of caster wheel 39. Latch means are provided for normally preventing rotation of caster wheel 39 with respect to frame 31, comprising spring-pressed bolt 41 slidably mounted in guide 42 on frame 31 and having an end normally disposed in slot 43 of collar 44 non-rotatably secured on post 38. Latch operating cord 46 extends forwardly from the front end of bolt 41, and is suitably secured to seat 21 so as to be accessible to the operator.

Thus, the implement frame is movably mounted at its front end on the tractor and is provided with a releasably locked caster wheel support at its rear end.

The implement supported from frame 31 is, preferably, a conventional grader or maintenance blade 51 adjustably mounted by means of a tool carrying frame comprising conventional circle 52 in the usual type of circle-carrying frame 53. Telescopic lift means are provided for supporting the blade and circle assembly for vertical adjustment; telescopic adjustment thereof being accomplished by power control means operable from seat 21. As each lift means is similar, only one is described in detail. The telescopic lift means includes cylinder 56, and piston 57 pivotally connected at 58 to circle-carrying frame 53. Cylinder 56 has transversely aligned pivotal connections 59 (Fig. 2) with collar or ring 61, having longitudinally aligned pivotal connections 62 with transverse frame angles 63 suitably mounted on side members 32, 33. By virtue of pivotal connections 59, 62, the lift means is universally supported on the frame of the machine.

To accomplish adjustment of the lift means, flexible pipe connections 64 communicate with cylinder 56 at the opposite ends thereof, and extend forwardly to valve 66, having control lever 67, and having a suitable connection with pressure tank 68. By adjusting control lever 67, cylinder 56 and piston 57 can be adjusted telescopically to raise or lower the blade, or can be maintained in any adjusted position. To prevent transverse movement of the blade 51 with respect to frame 31, transverse lock link 71 is provided, having a pivotal connection at its lower end with frame 53, and at its upper end with frame 31.

A draft connection is provided for the blade or tool carrying frame 52, 53 to the drawbar of the tractor and independent of the implement main frame 31. At its front end (Fig. 1), frame 53 has downwardly extending bracket 72 secured thereto and which is connected by a suitable draft link and pin to drawbar 73 of the tractor.

A scarifier is mounted at the rear end of the tractor in front of implement or blade 51. The scarifier comprises block 81 having a plurality of transversely spaced scarifier teeth 82 detachably mounted thereon. Block 81 also has opposite side draft connections 83 extending forwardly, and pivotally connected to body 10 at 84. Adjacent block 81, spaced lift bars 86 are pivotally connected at 87 to draft connections 83. Lift bars 86 extend upwardly and are connected together at their upper ends by cross rod 88; cross rod 88 having lift nut 89 threaded onto lift screw 91, suitably mounted on body 10 and having operating hand wheel 92 immediately to the rear of seat 21. Turning of hand wheel 92 provides means for adjustment of scarifier teeth 82 relative to the ground.

While particular forms of implements are shown, both on the implement frame and on the tractor, inasmuch as the implement frame construction and its mounting are particularly adapted for road apparatus, any other suitable implements can be employed, depending on the type of work to be done, without departing from the principle of the implement frame construction and attachment.

In the modification shown in Figs. 3 and 4, the tractor is similar to that described above, and corresponding parts have corresponding reference numerals. The implement frame is adjustably supported at its front end on the tractor, and at its rear end on a caster wheel to accomplish steering of the tractor and the frame as a unit. Vertical adjustment of the implement frame is designed to accomplish vertical adjustment of the implement.

Frame 101 (Figs. 3 and 4) includes spaced side members 102, 103, having downwardly extending brackets 104 welded to the front ends thereof. Brackets 104 are pivotally connected by pins 106 to the rear ends of arms 107, which are secured for rotation with shafts 108 journaled in respective housings 109 on track frames 16. Shafts 108 are in axial alignment with pivot shaft 12 (Fig. 2) which connects track frames 16 and body 10 as described previously. Rotation of shafts 108 (Figs. 3 and 4) serves to oscillate arms 107, to raise or lower the front end of implement frame 101. Within each housing 109 (Fig. 3), worm wheel 111 is secured on shaft 108 and is engaged by worm 112 on shaft 113. Shaft 113 extends without housing 109 and is universally connected to telescopic shaft 114 which is universally connected at its upper end to shaft 116 in housing 117 on body 10. Bevel gear connection 118 is provided within housing 117 to connect shaft 116 to transverse telescopic shaft 119 extending inwardly and connected by bevel gear connection 121 in housing 122 to vertical shaft 123. Hand wheel 124 is provided at the upper end of shaft 123 to operate respective shafts 108 and arms 107. Thus, by turning of the hand wheel 124, shafts 108 and arms 107 can be moved to raise or lower the front end of the frame 101. Worms 112 and worm wheels 111 are irreversible; therefore, the adjustment of the front end of the frame is maintained for any adjusted position.

Side members 102, 103 (Figs. 3 and 4) converge rearwardly; and at their rear ends are connected by bracket 126 having vertically apertured boss 127. Hollow post 128 (Fig. 3) of caster wheel 129 extends upwardly within boss 127 for both sliding and pivotal movement with respect thereto. Spring-pressed latch pin 131 has an end normally engaged within vertical groove 132 in post 128 to maintain caster wheel 129 aligned for longitudinal travel of the vehicle. Cord 133 provides means for operating latch pin 131.

Telescopic lift means are provided between frame 101 and caster wheel 129 to provide for vertical adjustment of the rear end of frame 101. Screw member 136 (Fig. 3) has a lower cylindrically shaped end portion 136' journaled within hollow post 128, and is held against endwise movement with respect thereto by end flange 137 contacting post 128. Square shaft 138, integral with sleeve extension 139 of bracket 126, extends downwardly from the top thereof and has telescopic engagement with a complementary deep recess in the top of screw member 136 to prevent rotation of the screw member while permitting relative endwise movement. Screw member 136 has threaded engagement with nut member 141 mounted for rotation, and held against endwise movement within housing portion 142 of bracket 126. Nut member 141 has integral worm wheel 143 (Figs. 3 and 4) which is engaged by worm 144 (Fig. 4) on shaft 146 journaled in housing portion 142. Shaft 146 (Figs. 3 and 4) has universal connection 147 with telescopic shaft 148 having universal connection 149 at its front end with shaft 151. Shaft 151 is journaled in bracket 152 and has hand wheel 153 secured thereon adjacent seat 21. By operating hand wheel 153, nut member 141 can be rotated in either direction on screw member 136 to effect endwise displacement of the screw member so as to raise or lower the rear end of frame 101.

Thus, both ends of frame 101 are adjustable vertically to raise or lower frame 101 and correspondingly adjust the implement supported thereon.

The implement which is mounted on frame 101, comprises a combined blade and scarifier which is adjustable to operate as either a blade or a scarifier, as determined from control means located adjacent operator's seat 21. Blade 161 (Figs. 3 and 4) is provided on moldboard 162 which is adjustably mounted in a conventional manner on circle 163 in circle-carrying frame 164. A plurality of transversely spaced vertical slots are provided in blade 161 in alignment with apertured bosses 166 of moldboard 162. The outer scarifier teeth 167 and the middle teeth 167 are slidably mounted in bosses 166 and have their upper ends connected by shafts 168 connected to the outer teeth and by pins 169 connected to the middle teeth (Fig. 4), to the slotted ends of arms 171 on cross shaft 172 suitably journaled on circle 163. Shaft 172, at its center, extends through housing 173 and has worm wheel 174 (Fig. 3) secured thereon and engaged by worm 176 on shaft 177. Shaft 177 is universally connected to telescopic shaft 178 which extends upwardly and is universally connected to shaft 179, journaled in bracket 152 and having hand wheel 182 thereon adjacent seat 21. By rotating hand wheel 182, shaft 172 can be oscillated to extend or withdraw teeth 167 with respect to blade 161.

A draft connection for the implement is similar to that described above, and includes bracket 186 (Fig. 3) having draft connection 187 with drawbar 73 of the tractor. At its rear end below side member 103, frame 164 has universal connection 191 with link 192 pivotally connected at 193 to side member 103. The opposite side of frame 164 is similarly connected to side member 102. Thus the implement is supported on frame 101 for vertical adjustment therewith, and has a draft connection with tractor drawbar 73 independent of frame 101.

In Fig. 5, an implement in the form of disk plows 196 is provided on frame 164 which is supported by frame 101, similar in all respects to that shown in Figs. 3 and 4.

Therefore, I claim as my invention:

1. In a road working apparatus, a draft vehicle, an auxiliary main frame comprising spaced side members movably connected adjacent their front ends to said draft vehicle, said side members converging toward their rear ends to provide a narrow portion at the rear of said auxiliary frame, a caster wheel connected to said narrow portion of said auxiliary frame and mounted for vertical adjustment relative to said auxiliary frame, a circle assembly adjustably supported by said auxiliary frame and having a draft connection with the drawbar of said draft vehicle, and means including controls adjacent the operator's station on said draft vehicle for adjusting said caster wheel and said circle assembly.

2. In combination, a tractor, an operator's station on said tractor, a drawn implement, a frame supporting said implement, adjustable means mounting one end of said frame on said tractor and providing the sole support for said end, a caster wheel support, other adjustable means mounting the other end of said frame on said support for relative vertical movement, and control means for said adjustable means adjacent said operator's station.

3. In a road working apparatus, a draft vehicle, an operator's station on said draft vehicle, an auxiliary main frame comprising spaced side members movably connected adjacent their front ends to said draft vehicle, said side members converging toward their rear ends to provide a narrow portion at the rear of said auxiliary frame, a caster wheel connected to said narrow portion of said auxiliary frame, a circle assembly adjustably supported by said auxiliary frame and having a draft connection with said draft vehicle, and means including controls adjacent said operator's station for adjusting said circle assembly.

4. In a road working apparatus, a draft vehicle, an auxiliary main frame movably connected adjacent its front end to said draft vehicle and solely supported adjacent said front end by said draft vehicle, a caster wheel supporting the rear end of said auxiliary frame and connected thereto for relative vertical adjustment, a tool supporting frame adjustably supported by said auxiliary frame, and control means for adjusting said caster wheel and said tool supporting frame.

5. A road-surface grading machine comprising a tractor having an operator's station thereon, a grader blade supporting frame having its front end supported by the rear of said tractor for pivotal movement about a horizontal axis extending transversely of the line of draft of the machine, a caster wheel for supporting the rear end of said frame and mounted for movement about an upright axis to swivel in response to steering of said tractor, a circle assembly adjustably supported by said frame, a draft connection from said circle assembly to said tractor, a scraper blade mounted on said circle assembly, and operating means adjacent said operator's station on said tractor for adjusting the circle assembly.

CLARENCE L. BEST.